(12) United States Patent
Quintero

(10) Patent No.: US 12,294,288 B2
(45) Date of Patent: May 6, 2025

(54) SYSTEM, METHOD, AND CIRCUIT FOR ALTERNATING CURRENT (AC) AND DIRECT CURRENT (DC) STABILIZING PATH FOR A POWER SUPPLY

(71) Applicant: Analog Devices, Inc., Wilmington, MA (US)

(72) Inventor: Noe Quintero, Los Gatos, CA (US)

(73) Assignee: Analog Devices, Inc., Wilmington, MA (US)

(*) Notice: Subject to any disclaimer, the term of this patent is extended or adjusted under 35 U.S.C. 154(b) by 295 days.

(21) Appl. No.: 17/874,692

(22) Filed: Jul. 27, 2022

(65) Prior Publication Data

US 2023/0031068 A1  Feb. 2, 2023

Related U.S. Application Data

(60) Provisional application No. 63/226,355, filed on Jul. 28, 2021.

(51) Int. Cl.
| | |
|---|---|
| *H02M 1/12* | (2006.01) |
| *H02J 3/01* | (2006.01) |
| *H02M 1/10* | (2006.01) |
| *H02M 3/158* | (2006.01) |
| *H02M 7/217* | (2006.01) |

(52) U.S. Cl.
CPC .............. *H02M 1/126* (2013.01); *H02J 3/01* (2013.01); *H02M 1/10* (2013.01); *H02M 3/158* (2013.01); *H02M 7/217* (2013.01)

(58) Field of Classification Search
CPC ........ H02M 1/10; H02M 1/126; H02M 3/158; H02M 7/217; H02J 3/01

USPC .......................................................... 363/149
See application file for complete search history.

(56) References Cited

U.S. PATENT DOCUMENTS

| | | | | |
|---|---|---|---|---|
| 7,212,012 | B1* | 5/2007 | Zhang ................... | H02M 7/538 |
| | | | | 324/611 |
| 945,562 | A1 | 9/2016 | Yu et al. | |
| 9,831,781 | B2 | 11/2017 | Zhang et al. | |
| 2014/0133202 | A1 | 5/2014 | Tamaoka | |
| 2016/0036326 | A1* | 2/2016 | Sreenivas ............. | H02M 3/158 |
| | | | | 323/271 |
| 2016/0248328 | A1* | 8/2016 | Zhang .................... | H02M 1/08 |
| 2019/0271998 | A1* | 9/2019 | Sisson ................ | H02M 3/1584 |
| 2022/0231597 | A1* | 7/2022 | Zhang .................... | H02M 1/32 |

* cited by examiner

*Primary Examiner* — Yemane Mehari
(74) *Attorney, Agent, or Firm* — Schwegman Lundberg & Woessner, P.A.

(57) ABSTRACT

Techniques, methods, circuits, and systems are provided for providing stabilization for a circuit. One example system includes a switching converter coupled to a power source; a low-pass filter coupled to a load device; a direct current (DC) path; and an alternating current (AC) path, where the DC path and the AC path are provided between the switching converter and the low-pass filter, and where the AC path provides a non-phased information signal to be used to compensate for a phase delay occurring in the DC path. In a more specific implementation, the DC path can be configured to provide control, at low frequency, for an output to the load device. In addition, an error amplifier can be to the DC path and the AC path, where the low-pass filter and the error amplifier can be configured to determine a switchover between the AC path and DC path.

20 Claims, 7 Drawing Sheets

SYSTEM, METHOD, AND CIRCUIT FOR ALTERNATING CURRENT (AC) AND DIRECT CURRENT (DC) STABILIZING PATH FOR A POWER SUPPLY

PRIORITY DATA

This Application is a U.S. Non-Provisional of, and claims the benefit of Priority under 35 U.S.C. § 119(e), and under any other relevant statutes, to U.S. Provisional Patent Application Ser. No. 63/226,355 filed Jul. 28, 2021, entitled, "AC AND DC STABILIZING PATH FOR HIGH ACCURACY VARIABLE FILTERED SUPPLIES", which is hereby incorporated by reference in its entirety.

FIELD OF THE DISCLOSURE

The present disclosure relates to filters and, more specifically, to techniques, systems, methods, and circuits for providing an alternating (AC) and direct current (DC) stabilizing path for a power supply.

BACKGROUND

Many electronic devices tend to require much more sophisticated power supplies for supplying power. For example, many electronics may require high frequency, high overall efficiency, fewer components, and/or low ripple in the power supplied by the power supplies. More specifically, there is often a need for a power supply circuit that is capable of delivering power with high voltage components (fast changing voltage and current) with stable, clean power conversion and delivery.

Power supplies typically avoid lossy output filters in order to maximize efficiency. However, in low noise applications, linear drop out regulators are used to reduce noise and ripple at the cost of reduced efficiencies. A typical use case is to also add extra capacitance to the output. Their use of resistor-capacitor (RC) output filters are generally avoided in many applications since difference loads can cause current-resistor (IR) drops across the resistors. A simple fix to this recognized problem in the art is to connect the feedback after the resistor to compensate for the voltage drop. The power supply response is consequently tuned with this dominant output pole in mind.

In general terms, when designing a variable output supply, the RC pole will change significantly due to the voltage coefficient in the capacitor. The capacitance changes based on the applied voltage. Self-heating in the resistor can also occur. A voltage coefficient is the change in resistance with applied voltage. This is entirely different and in addition to the effects of self-heating when power is applied. Simple compensation loops will not work in these situations. Also, by adding a variable output, the compensation scheme can't be the same at all voltages and the response suffers. There is a need for an improved power supply system that is capable of tolerating large pole changes with increased stability.

Overview

Embodiments of the present disclosure overcome these shortcomings, and others, in proposing a new feedback compensation for many different types of circuits, (e.g., variable filtered designs). In one implementation, the load device may be a low voltage but a high current load device such as, for example, a computer central processing unit (CPU). This type of load device may have many load transient conditions. Techniques, methods, systems, and circuits disclosed herein can provide compensating filtered power supplies. AC and DC signal pathways can be separated prior, and after, respectively, of a filter and fed back into a compensator. This result is a mitigated ripple and a highly accurate DC power supply output. Conventional methods avoid filters on the output of supplies, which create losses and inaccuracies, along with as stability challenges. The prosed topology of the present disclosure alleviates these problems by having an AC feedback path before the filter and, further, a DC path feedback path after the filter to compensate for changes in the output voltage. The present disclosure can be applicable to any power supply (i.e., any type of power source) needing filtered accurate outputs that can be lossy.

More specifically, and in accordance with Example 1 of the present disclosure, there is a system disclosed for providing stabilization for a circuit, comprising: a switching converter coupled to a power source; a low-pass filter coupled to a load device; a DC path; and an AC path, where the DC path and the AC path are provided between the switching converter and the low-pass filter, and where the AC path provides a non-phased information signal to be used to compensate for a phase delay occurring in the DC path.

The general term 'power source' can include (and be part of) any type of power supply system. The power source may include any type of battery, a power grid, a solar photovoltaic cell, an AC generator, and/or an output of front-end power converter. A power interface device may be configured to increase or decrease the voltage of the power source to provide a suitable voltage for the load device. The power interface device may be a boost converter or a buck converter or any other converter based on particular needs. The system could also include a load device, where the power interface device is coupled to the electrical power source and the load device. The load device may include a resistive load, a magnetic load, a capacitive load, a heater, or any other suitable load based on particular circuitry needs.

In Example 2, the system of Example 1 could include that the DC path is configured to provide control, at low frequency, for an output to the load device. In Example 3, the system of Example 1 further comprises an error amplifier coupled to the DC path and the AC path, where the low-pass filter and the error amplifier are configured to determine a switchover between the AC path and DC path. Note that the error amplifier can be thought of as acting as a high pass filter in certain example implementations of the present disclosure. Hence, the crossover (i.e., the intersection between the AC path and DC path) can be determined, at least in part, by the error amplifier and the low-pass filter.

In Example 4, the system of Example 1 can further comprise an error amplifier coupled to the switching converter, where the error amplifier affects a DC gain for the switching converter. In Example 5, the system of Example 1 can include the low-pass filter and a resistor that are configured to operate as a lossy filter. In Example 6, the system of Example 1 further comprises a capacitor coupled to an output of the system in order to achieve a targeted ripple characteristic. In Example 7, the system of Example 1 can be part of a resistor-capacitor filter.

In Example 8, the system of Example 1 further comprises a resistor divider segment configured to control a DC gain for the circuit. In Example 9, the system of Example 1 can include that the low-pass filter is configured for use as a current sense resistor. In Example 10, the system of Example 1 further comprises a boost converter that includes the switching converter, which further comprises at least one inductor and at least one diode. In Example 11, the system of Example 1 can further include that the system is part of a resistor-inductor (RL) filter. In Example 12, the system of Example 1 can further include that the system is part of an inductor-capacitor (LC) filter.

According to Example 13 of the present disclosure, a method for providing stabilization for a circuit includes powering up the circuit with a power source coupled to a switching converter; evaluating a voltage output through an error amplifier; comparing the voltage output to a set point associated with a target voltage output; enabling the switch converter to evaluate an AC path and a DC path; evaluating the DC path to identify an absolute voltage for comparison with the set point associated with the target voltage output; and changing an AC response based, at least in part, on the comparison such that the voltage output of the circuit is moved closer to the set point.

In Example 14, the method of Example 13 can further include increasing the voltage output on the output of the circuit based on the comparison. In Example 15, the method of Example 13 can further include decreasing the voltage output on the output of the circuit based on the comparison. In Example 16, the method of Example 13 can further include providing a capacitor coupled to an output of the circuit in order to achieve a targeted ripple characteristic.

According to Example 17 of the present disclosure, a non-transitory computer readable storage medium storing software code portions configured, when executed on a processor, for providing stabilization for a circuit by: powering up the circuit with a power source coupled to a switching converter; evaluating a voltage output through an error amplifier; comparing the voltage output to a set point associated with a target voltage output; enabling the switch converter to evaluate an AC path and a DC path; evaluating the DC path to identify an absolute voltage for comparison with the set point associated with the target voltage output; and changing an AC response based, at least in part, on the comparison such that the voltage output of the circuit is moved closer to the set point.

In Example 18, the non-transitory computer readable storage medium according to claim 17, can include software code portions being further configured for: increasing the voltage output on the output of the circuit based on the comparison. In Example 19, the non-transitory computer readable storage medium according to claim 17, can include that the software code portions are further configured for decreasing the voltage output on the output of the circuit based on the comparison. Example 20, the non-transitory computer readable storage medium according to claim 17, can include that the software code portions are further configured for providing a capacitor coupled to an output of the circuit in order to achieve a targeted ripple characteristic.

According to any one of the preceding or proceeding aspects of the present disclosure, the system and/or method for stabilizing the output of a filtered switching converter includes feedback pathway before the filter. According to any one of the preceding or proceeding aspects of the present disclosure, the system and/or method for stabilizing the output of a filtered switching converter includes feedback pathway after the filter. According to any one of the preceding or proceeding aspects of the present disclosure, the system and/or method for stabilizing the output of a filtered switching converter comprises an operational amplifier.

According to any one of the preceding or proceeding aspects of the present disclosure, the operational amplifier compares the combination of the two feedback pathways with a reference voltage. According to any one of the preceding or proceeding aspects of the present disclosure, the system and/or method for stabilizing the output of a filtered switching converter comprises a regulator which regulates the output voltage of the switching converter. According to any one of the preceding or proceeding aspects of the present disclosure, the switching converter is an inverting converter. According to any one of the preceding or proceeding aspects of the present disclosure, the system and/or method for stabilizing the output of a filtered switching converter comprises a charge pump.

According to any one of the preceding or proceeding aspects of the present disclosure, the system and/or method for stabilizing the output of a filtered switching converter comprises a second order filter. According to any one of the preceding or proceeding aspects of the present disclosure, the system and/or method for stabilizing the output of a filtered switching converter comprises a step to step to separate the AC and DC paths in the output.

According to any one of the preceding or proceeding aspects of the present disclosure, where the DC path comprises lower frequency signals. According to any one of the preceding or proceeding aspects of the present disclosure, where the AC path comprises higher frequency signals. According to any one of the preceding or proceeding aspects of the present disclosure, the system and/or method for stabilizing the output of a filtered switching converter comprises a current limiter. According to any one of the preceding or proceeding aspects of the present disclosure, the system and/or method for stabilizing the output of a filtered switching converter comprises a sensor array.

According to any one of the preceding or proceeding aspects of the present disclosure, where the sensor array comprises avalanche photodiodes. According to any one of the preceding or proceeding aspects of the present disclosure, where the output can be varied from 0V to −350V. According to any one of the preceding or proceeding aspects of the present disclosure, the system and/or method for stabilizing the output of a filtered switching converter comprises an SPI interface. According to any one of the preceding or proceeding aspects of the present disclosure, the system and/or method for stabilizing the output of a filtered switching converter comprises a multiplexer.

According to any one of the preceding or proceeding aspects of the present disclosure, the system and/or method for stabilizing the output of a filtered switching converter comprises a comparator. According to any one of the preceding or proceeding aspects of the present disclosure, the system and/or method for stabilizing the output of a filtered switching converter comprises high precision resistors. According to any one of the preceding or proceeding aspects of the present disclosure, the system and/or method for stabilizing the output of a filtered switching converter comprises at least one of ADC, DAC and REF circuit. According to any one of the preceding or proceeding aspects of the present disclosure, the system and/or method for stabilizing the output of a filtered switching converter comprises embodiments an op-amp. According to any one of the preceding or proceeding aspects of the present disclosure, the system and/or method for stabilizing the output of a filtered switching converter comprises a temperature indicator.

The drawings show example switching circuits and configurations. Variations of these circuits, for example, changing the positions of, adding, or removing certain elements from the circuits are not beyond the scope of the present invention. The illustrated switching converter, configurations, and complementary devices are intended to be complementary to the support found in the detailed description.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

For a fuller understanding of the nature and advantages of the present invention, reference is made to the following detailed description of preferred embodiments and in connection with the accompanying drawings, in which.

DETAILED DESCRIPTION OF EXAMPLE EMBODIMENTS OF THE DISCLOSURE

Operational Overview for Compensating Filtered Supplies

Figure 1:
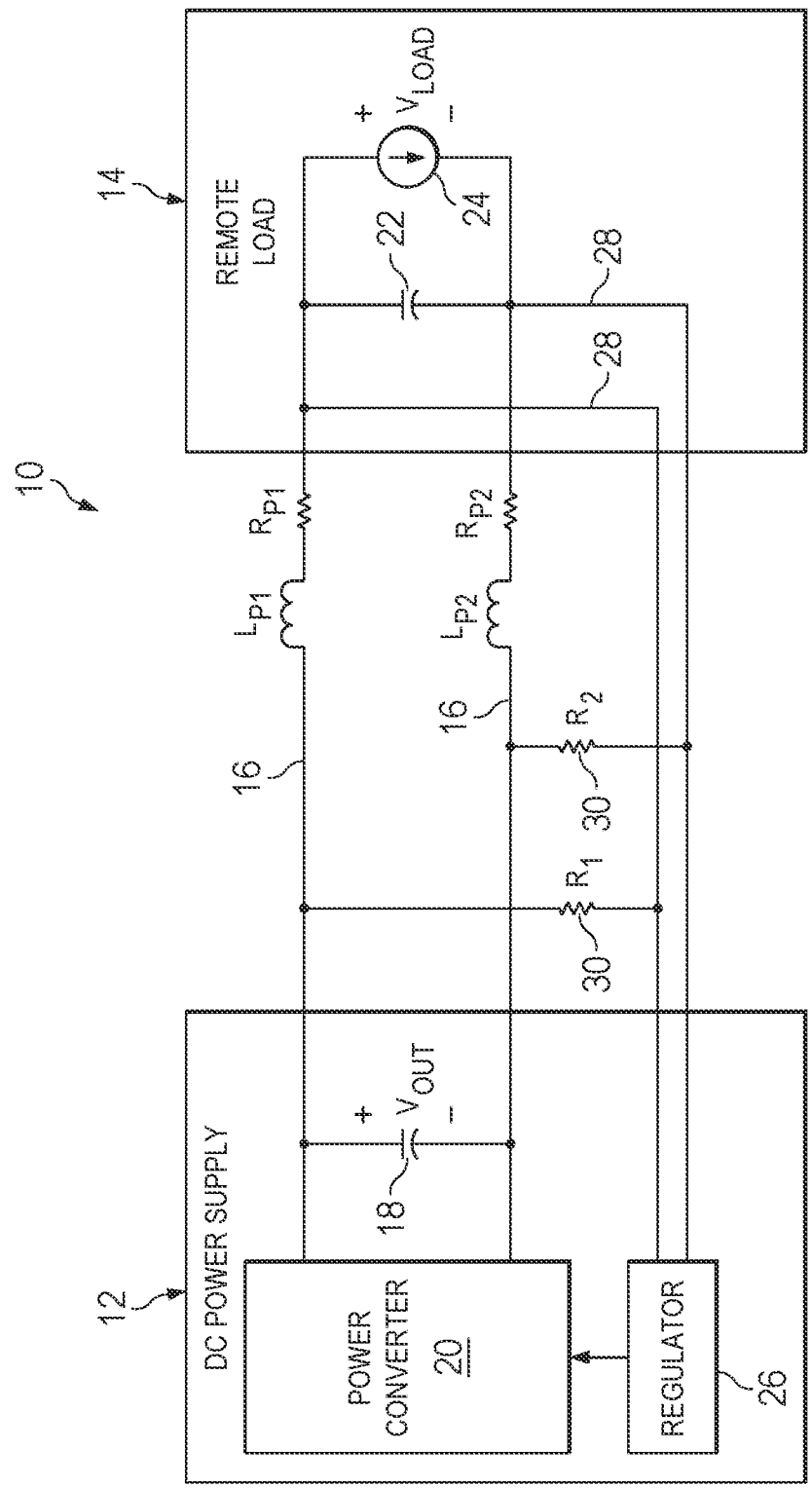
FIG. 1 depicts an example diagrammatic view of a feedback system for monitoring supply voltage, in accordance with some embodiments of the disclosure provided herein.

During a load transient condition, the current of the load device may substantially change within a very short time period. For example, during the transient condition, the current of the load device may increase from 0 A to 100 A, or decrease from 100 A to 0 A, in less than one microsecond. These sudden changes in current can create large voltage variation at the load device and can cause the output voltage to swing outside of the regulated operating window of the load device.

To minimize transient variations, in one implementation, a large power capacitor may be added to the output of the power supply system. The capacitor may source or sink the necessary current during the transient condition and therefore reduce voltage variation caused by the load transient. To this end, the output capacitor is useful in supplementing the inductor's slowly rising current to meet the increase in current demand from the load device.

Similarly, the output capacitor is useful in sinking the current to meet the sudden decrease in current from the load device. Capacitors, however, are expensive and as such may increase cost or size of the system. Another implementation may require high voltage with low current, such as, a reverse biased detector. However, in many of these applications, low ripple (or noise) is highly desirable.

In another implementation, the converter may be pushed to run at higher bandwidth to respond to a load transient quickly. However, a switching mode converter bandwidth is limited by its switching frequency. Therefore, to push the converter to run at the higher bandwidth, the converter has to operate at higher switching frequency. This can mean more power loss because each time there is a turn on/off of the switch, there is a power loss. As such, the power supply system is also limited by the power loss of the power converter placed between the power source and the load device.

There is a universal need to reduce the number of components used in switching power supply circuits, such as output capacitors and inductors, and the associated costs of using such capacitors and inductors. The output capacitors often used are a large value, a low-ESR (Equivalent Series Resistance) type, requiring the use of large electrolytic capacitors with exotic electrolytes. These output capacitors are required to reduce the ripple voltage caused by repetitive currents from the switching action of the regulator appearing at the output of the power supply. The quantity and quality of these capacitors add greatly to the cost of the power supply, and the volume added to by these capacitors may be unattractive for use in portable electronic devices. Additionally, the low-ESR capacitors may also be undesirable, as the electrolytes can be flammable and create a fire hazard. In addition, some high-current switching regulator circuits use several inductors, with a controller which phases the switching of the inductors to reduce output ripple. The use of multiple inductors undesirably adds to the cost of the power supply.

Further, a low voltage ripple is desirable in switching power supplies. For example, modern microprocessors are increasingly operated at low voltages due to increased chip density and lower voltage breakdown in advanced CMOS (Complementary Metal Oxide Semiconductor) technology. At these low voltages, the power supply ripple may be a substantial portion of the supply voltage.

High ripple may undesirably require the power supply output voltage to be raised above the optimal level in order to ensure that a circuit is supplied with the minimal voltage required during periods when the ripple voltage drives the voltage excursions to a minimum. As an additional example, a RF PA requires its power supply to exhibit low ripple at its output. Ripple typically occurs synchronously to the switching frequency of the switching regulator and can feed through to the output of the PA, causing unwanted distortion in the RF output signal.

There have been some efforts to improve the conventional switching regulator circuits. For example, one could use both a switching regulator and a linear regulator and have a simple summing node to combine outputs from the linear regulator and the switching regulator to form the output of the power supply, with the intention that the linear regulator provides the high frequency, and the switching regulator provides the low frequency and DC components of the current to the load. These circuits, however, place a lot of burden on the linear regulator, as it requires the linear regulator to supply a large amount of excess current to modulate the voltage in the large capacitors needed by the switching regulator.

Alternatively, a switching regulator and linear regulator may be placed in series, with the switching regulator's output feeding the linear regulator's input. In this arrangement, the linear regulator may be capable of delivering high frequency components of the power, while the switching regulator may deliver power efficiently to the linear regulator. However, this series arrangement forces all the power delivered to the load to pass through the linear regulator, causing dissipation in the linear regulator and substantially reducing the overall efficiency of the power supply.

Hence, a need exists for a power supply system of the load device while increasing the efficiency and reducing costs and size. Additionally, there remains a need in the art for a power supply system that is capable of providing a fast response to the transient condition of the load while providing power with very low voltage ripple. The present disclosure has overcome these shortcomings and achieved better overall efficiency, high bandwidth, and a reduced number of components. Embodiments of the present disclosure offer AC and DC stabilizing pathways for high accuracy variable filtered power supplies.

The present disclosure relates to sensing an output voltage of a DC power supply. More specifically, this disclosure describes techniques, methods, circuits, and systems providing novel feedback to regulate a DC power supply. Power from a switching converter is regulated via two separate pathways: low frequency and high frequency. The high frequency (also known as AC in some embodiments) can be tapped before a low-pass filter is applied to output of the switching converter.

FIG. 1 depicts an example diagrammatic view of a conventional feedback system for monitoring supply voltage, in accordance with some embodiments of the disclosure provided herein. Referring to FIG. 1, a feedback system 10 is used to monitor voltage supplied by a power supply 12 to a remote load 14 (e.g., microprocessor, memory chip, etc.). A pair of printed circuit board (PCB) conductors 16 (e.g., wires, traces, etc.) is connected across an output capacitor 18 of a power converter 20 included in power supply 12. Conductor pair 16 extends and can be connected across remote load 14, which in this example is a capacitor 22 and a current source 24 (e.g., to model a microprocessor).

In operation of an example flow, consider an example involving a switching converter that includes feedback and a voltage in (Vin). When a large filter is present, the propagation delay is dominated by the large filter. There is an RC time constant present that adds to the delay. This lag adds to instability for the circuit where undershooting and overshooting on the voltage would be prevalent. The IR drop (if significant enough) will reduce the accuracy characteristics of the circuit. Note that a resistor-capacitor circuit (RC circuit), or RC filter or RC network, is a simple electric circuit composed of resistors and capacitors. It may be driven by a voltage or current source and these will produce different responses. A first order RC circuit is composed of one resistor and one capacitor and is the simplest type of RC circuit. RC circuits can be used to filter a signal by blocking certain frequencies and passing others. The two most common RC filters are the high-pass filters and low-pass filters; band-pass filters and band-stop filters usually require resistor-inductor-capacitor (RLC) filters, though crude ones can be made with RC filters.

To regulate the output voltage of DC power supply 12, a regulator 26 monitors the output voltage ($V_{OUT}$) of the supply and the load voltage ($V_{LOAD}$) present at load 14 to be fed back to the regulator on lines 28 and 30 as feedback information. By sensing these voltages, regulator 26 can use this feedback information to initiate adjustments to power converter 20 so as to compensate for the voltage drops due to losses in conductor pair 16. Similarly, a pair of conductors 30 with resistors $R_1$, $R_2$ is connected across output capacitor 18 to provide $V_{OUT}$ to regulator 26, obtained locally.

As current flows from DC power supply 12 to remote load 14 to deliver $V_{OUT}$, voltage drops may be experienced on conductor pair 16 due to parasitic impedances associated with the conductors. These parasitic impedances may be caused, e.g., by the material properties of the conductors, the physical geometry of each conductor, and/or the layout of the conductors. Furthermore, due to interconnection points along conductor pair 16 to other systems or components (between DC power supply 12 and remote load 14), additional parasitic impedances may be introduced that produce additional voltage drops. To represent the parasitic impedances associated with conductor pair 16, each conductor is shown to include an equivalent parasitic inductance (i.e., $L_{P1}$ and $L_{P2}$) and an equivalent parasitic resistance (i.e., $R_{P1}$ and $R_{P2}$).

Along with producing voltage drops along conductor pair 16, parasitic impedances may alter the spectral content of $V_{OUT}$. Thus, the spectral content of $V_{LOAD}$ may differ from the spectral content of $V_{OUT}$. In particular, the spectral content of $V_{OUT}$ may be filtered by the combination of the parasitic impedances and load capacitor 22. By connecting $L_{P1}$ and $R_{P1}$ (and $L_{P2}$ and $R_{P2}$) to load capacitor 22, a low pass filter is produced that attenuates the higher frequency content of $V_{LOAD}$ (with respect to higher frequency content of $V_{OUT}$).

By reducing the high frequency content of $V_{LOAD}$, additional phase delay is introduced into feedback system 10 by the signals that propagate from remote load 14 to regulator 26 (via conductor pair 28). Due to this additional phase delay, the stability of feedback system 10 may be reduced along with the accuracy of DC power supply 12.

Figure 2:
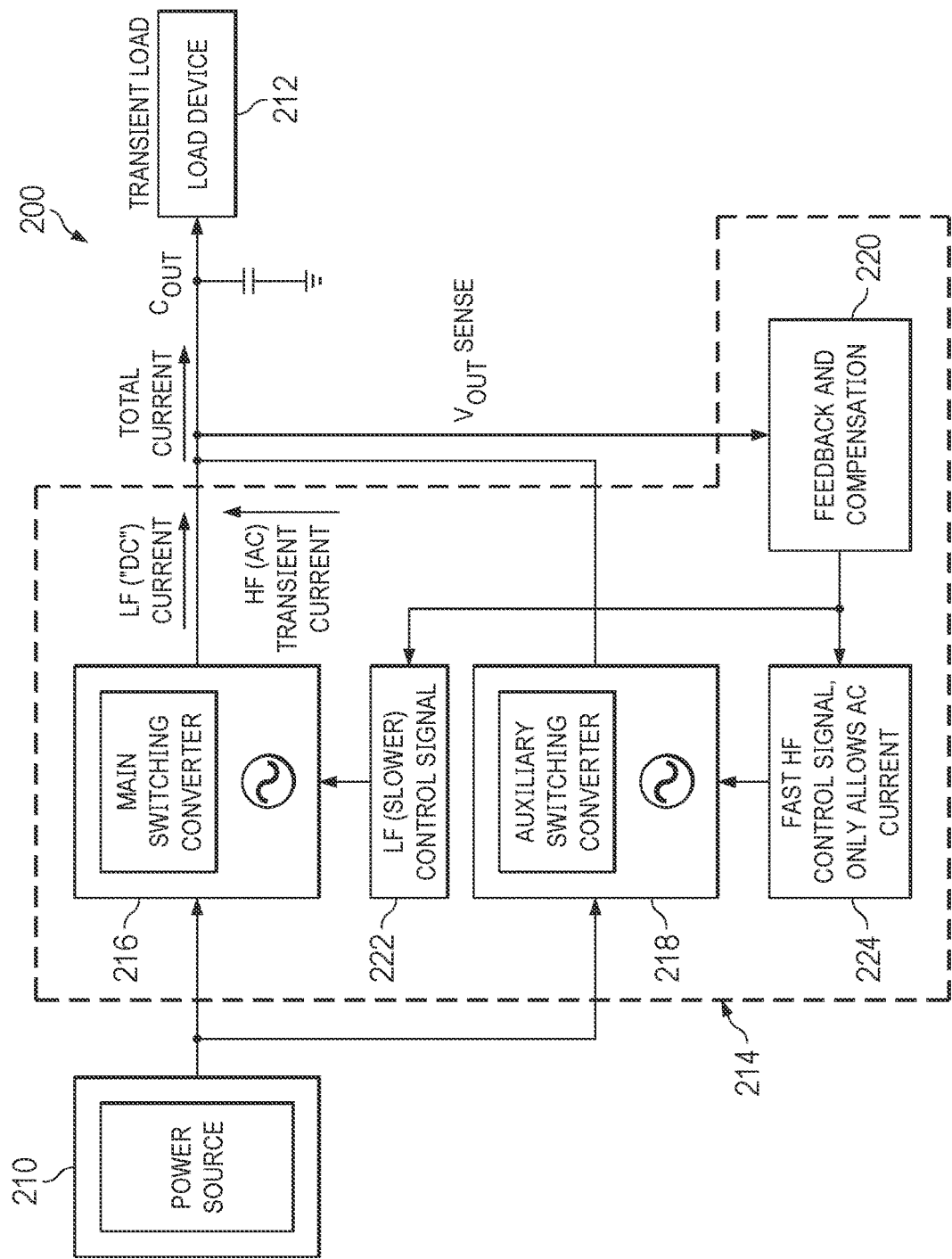
FIG. 2 depicts an example diagrammatic view of a power supply system including two separate control signals for driving the main switching converter and the auxiliary switching converter, in accordance with some embodiments of the disclosure provided herein.

FIG. 2 depicts an example diagrammatic view of a power supply system including two separate control signals for driving the main switching converter and the auxiliary switching converter, in accordance with some embodiments of the disclosure provided herein. FIG. 2 illustrates an example power supply system 200 including two separate control signals for driving the main switching converter and the auxiliary switching converter. The power supply system 200 does not use non-linear control with Vout transient detection as shown in FIG. 2. Instead, a linear control is used so it is easy to design and optimize the power supply system 200. The power supply system 200 also does not need an additional power capacitor for separating the high frequency current from the low frequency current for driving the auxiliary switching converter. This can reduce the size and costs of the power supply system 200.

The power supply system 200 includes a power source 210, a load device 212 and a power interface device 214 coupled to the power source 210 and the load device 212. The power source 210 and the load device 212 are similar to the power source 110 and the load device 112. Therefore, for the sake of clarity and brevity of description, they are not described in more detail. The power interface device 214 includes a main switching converter 216, an auxiliary switching converter 218, a feedback and compensation circuit 220, a low frequency control signal driving circuit 222, and a high frequency control signal driving circuit 224.

The main switching converter 216 is connected in parallel with the auxiliary switching converter 218. The main switching converter 216 may be configured to source or sink only a low frequency current. To this end, the main switching converter 216 may be switching at a low frequency to maintain high efficiency of the main switching converter 216. The auxiliary switching converter 218 may be configured to source or sink only a high frequency current. To this end, the auxiliary switching converter 218 may be switching at a high frequency to achieve high loop bandwidth and track high frequency transient. In steady state, the auxiliary switching converter 218 provides near zero load current and has low power loss, as such power loss is limited in time to the duration of the transient condition at the load device 212.

The power interface device 214 also includes the feedback and compensation circuit 220. The feedback and compensation circuit 220 is connected at one end to the output terminal and at the other end to the low frequency driving circuit 222 and the high frequency driving circuit 224. The feedback and compensation circuit 220 is configured to detect transients at the load device 212, generate a transient signal and control the switches in the main switching converter 216 and the auxiliary switching converter 218 based on the transient signal to provide a stable Vout as quickly as possible.

The transient may include a scenario in which there is a sudden increase or decrease in the load current or voltage. To illustrate one example, during a 25 A current load step at the output, the transient may correspond to the beginning of the load step, where there is a sudden increase in the load current before reaching a first steady-state level at the increased level of 25 A. Similarly, the transient may correspond to the ending of the load step where there is a sudden decrease in the load current before reaching a second steady-state level. The second steady-state may correspond to a state prior to the 25 A current load step or to a new state higher or lower than the state prior to the 25 A current load step.

The transient signal is provided to the low frequency control driving circuit 222 and the high frequency control driving circuit 224. The transient signal includes a lower frequency component and a higher frequency component. The low frequency control driving circuit 222 is configured to separate the lower frequency component of the transient signal from the higher frequency component of the transient signal and drive the main switching converter 216 based on the lower frequency component to respond to the transient condition. The high frequency driving circuit 224 is configured to separate the higher frequency component of the transient signal from the lower frequency component of the transient signal and drive the auxiliary switching converter 218 based on the higher frequency component to respond to the transient condition.

In operation, both the main switching converter 216 and the auxiliary switching converter 218 are operating to provide a stable Vout as quickly as possible. For example, if there is a sudden increase in the load current due to a positive load step (e.g., from 0 A to 100 A), the main switching converter 216 and the auxiliary switching converter 218 operate to source current to the output. Due to its higher switching frequency and higher loop bandwidth, the auxiliary switching converter 218 may be configured to source current faster to the load device 212 from the power source 210 than the main switching converter 216.

The sourced current from the auxiliary switching converter 218 may track the higher frequency component of the transient signal. As such, the sourced current from the auxiliary switching converter 218 is present only during the transient and not during the steady-state operation. That is, once the transient ends (e.g., in the steady state), the auxiliary switching converter 218 source near zero load current. In keeping with the previous example, the sourced current from the auxiliary switching converter 218 is present when there is a sudden change in the load current from 0 A to 100 A and not during the steady-state period where the load current remains at 100 A before falling back to 0 A or to some other level.

In contrast, the sourced current from the main switching converter 216 may track the lower frequency component of the transient signal and also track the lower frequency current in the steady state. To this end, the sourced current from the main switching converter 216 is present not only during the transient but also during the steady-state operation. In keeping with the previous example, the sourced current from the main switching converter 216 tracks the lower frequency component of the transient signal to slowly rise to reach 100 A and is maintained at 100 A until the load step terminates.

For another example, if there is a sudden decrease in the load current, the main switching converter 216 and the auxiliary switching converter 218 operate to sink current from the output to the ground. Again, due to its higher switching frequency and higher loop bandwidth, the auxiliary switching converter 218 may be configured to sink current from the load device 212 faster than the main switching converter 216. Furthermore, the auxiliary switching converter 218 may be controlled by the driver 224 to sink current that tracks the higher frequency component of the transient signal. As such, the current is sunk only during the transient and not during the steady-state operation.

In keeping with the previous example, the sunk current from the auxiliary switching converter 218 is present when there is a sudden change in the load current from 100 A to 0 A and not during the steady-state period where the load current remains at 0 A or some other level. In contrast, the main switching converter 216 may be controlled by the driver 222 to sink current that tracks the lower frequency component of the transient signal. In keeping with the previous example, the main switching converter 216 may slowly sink current from the output until the load current reaches a new threshold level. In keeping with the previous example, the new threshold level may be 0 A.

After the termination of the transient, the power interface device 214 may return to its normal operation. In its normal operation, the main switching converter 216 may source a low frequency current to the output at a level corresponding to the level prior to the load step or to a new level after the load step. However, after the termination of the load step, the auxiliary switching converter 218 may not source or sink additional DC current to the output to maintain high efficiency.

To prevent lower frequency component of the transient signal from entering the auxiliary switching converter 224, the high frequency control driving circuit 224 may employ a high pass filter. The high pass filter is configured to filter out the lower frequency component of the transient signal and allow the higher frequency component of the transient signal to activate or drive the auxiliary switching converter 218. Similarly, to prevent the higher frequency component of the transient signal from entering the main switching converter 216, the low frequency control driving circuit 222 may employ a low pass filter. The low pass filter is configured to filter out the higher frequency component of the transient signal and allow the lower frequency current to activate or drive the main switching converter 216.

Figure 3:
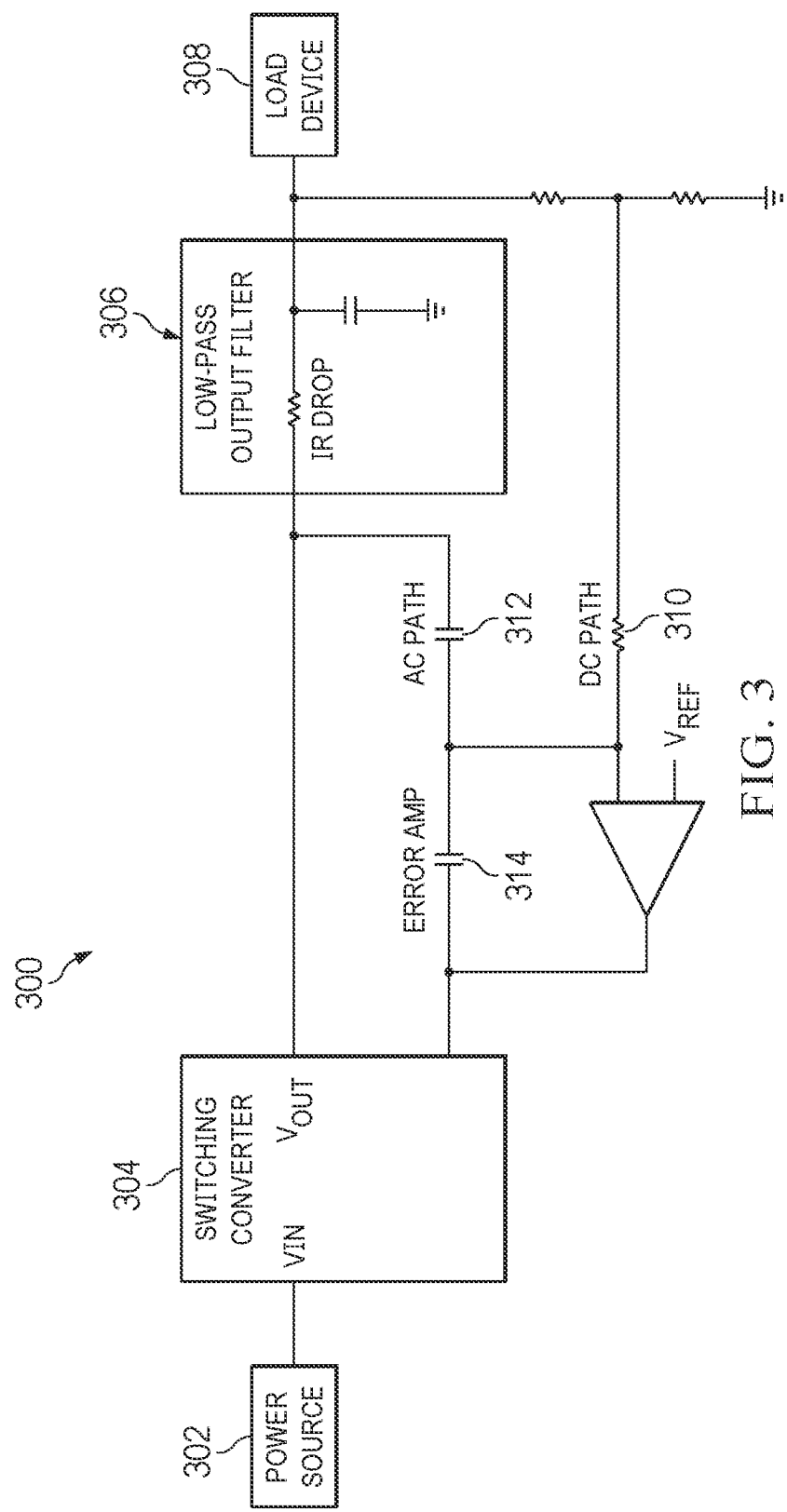
FIG. 3 depicts an example diagrammatic view of a power supply circuit including two separate AC/DC pathway signals, in accordance with some embodiments of the disclosure provided herein.

FIG. 3 depicts an example diagrammatic view of a power supply circuit 300 including two separate pathway signals, in accordance with some embodiments of the disclosure provided herein. In this non-limiting example, power supply circuit 300 comprises a power source 302, a switching converter 304, a low pass filter 306, a DC path 310 (which can form a resistor ladder), an error amp 314, and an AC path 312 (which can include one or more capacitors).

Typically, power source can VOUT any power source, such as, an AC wall outlet or a DC supply. In the present embodiment, the switching converter is a boost converter. A boost converter (step-up converter) is a DC-to-DC power converter that steps up voltage (while stepping down current) from its input (supply) to its output (load). It is a class of switched-mode power supply (SMPS) containing at least two semiconductors (a diode and a transistor) and at least one energy storage element: a capacitor, inductor, or the two in combination. To reduce voltage ripple, filters made of capacitors (sometimes in combination with inductors) are normally added to such a converter's output (load-side filter) and input (supply-side filter).

Power for the boost converter can come from any suitable DC source, such as batteries, solar panels, rectifiers, and DC generators. A process that changes one DC voltage to a different DC voltage is called DC to DC conversion. A boost converter can be thought of as a DC-to-DC converter with an output voltage greater than the source voltage. A boost converter is sometimes called a step-up converter since it "steps up" the source voltage. Since power (P=VI) must be conserved, the output current is lower than the source current.

In one or more embodiments, filter is a low-pass filter (LPF). A low-pass filter is a filter that passes signals with a frequency lower than a selected cutoff frequency and attenuates signals with frequencies higher than the cutoff frequency. The exact frequency response of the filter depends on the filter design. The filter is sometimes called a high-cut filter, or treble-cut filter in audio applications. A low-pass filter is the complement of a high-pass filter.

Low-pass filters exist in many different forms, including electronic circuits such as a hiss filter used in audio, anti-aliasing filters for conditioning signals prior to analog-to-digital conversion, digital filters for smoothing sets of data, acoustic barriers, blurring of images, and so on. The moving average operation used in fields such as finance is a particular kind of low-pass filter and can be analyzed with the same signal processing techniques as are used for other low-pass filters. Low-pass filters provide a smoother form of a signal, removing the short-term fluctuations and leaving the longer-term trend.

In a generally sense, FIG. 3 can be viewed as a simple first order RC low-pass filter (LPF). However, second or higher order filters are not beyond the scope is not beyond the scope of the present disclosure. As is noted through the present disclosure, an IR drop occurs of the resister in the current configuration. This produces an undesirable phase delay particularly at higher switching frequencies.

In practice, switching converter provides an output voltage $V_{out}$ to filter which is then delivered to a load device. The DC component is fed back from after the resistor, in order to compensate for the IR drop. An additional feedback path (AC) is provided before the resister and/or filter. The high frequency pathway before the dominate RC pole improves supply performance and increases circuit stability under a much wider range of poles. The present topology can tolerate large pole changes more than 100× in changes for the output frequency response when properly tuned.

In one or more embodiments, the error amp is a differential amplifier. A differential amplifier is a type of electronic amplifier that amplifies the difference between two input voltages but suppresses any voltage common to the two inputs. It is an analog circuit with two inputs in which the output is ideally proportional to the difference between the two voltages:

$$V_{out}=A(V_{in}^+ - V_{in}^-)$$

where A is the gain of the amplifier.

Single amplifiers are usually implemented by either adding the appropriate feedback resistors to a standard op-amp, or with a dedicated integrated circuit containing internal feedback resistors. It is also a common sub-component of larger integrated circuits handling analog signals.

Error amplifier compares the recombination of the AC and DC signals with a reference voltage $V_{ref}$. In one or more embodiments, the reference voltage $V_{ref}$ is set to a bias voltage of load device. In other embodiments, the output is a scaled version of reference $V_{ref}$. In some embodiments, reference voltage $V_{ref}$ can be adjusted, particularly in transient conditions, such as, from thermal drift, gain change, and voltage coefficient.

In operation of the example circuit configuration of FIG. 3, a boost converter can be provisioned that includes switching converter 304, which further includes an inductor and a diode. As depicted, between the switching converter 304 and the low-pass output filter 306 is DC 310 path and AC path 312. The AC path 312 is being used to compensate for the phase delay being experienced by the DC path 310. Typically, a series resistance can be used at the switching converter but this can instead be addressed by having a larger capacitor. While effective in certain scenarios, this does not provide much in the way of filtering.

From a frequency perspective, at low frequencies, the path that prevails is the one that goes completely to the output (i.e., the resistor-divider path that is the DC path). There is also a more tailored crossover path between when the DC path provides the dominant input to the error amplifier and when the AC path provides the dominant input to the error amplifier. The AC path should be tuned to crossover (i.e., to 'switch', 'switchover', 'compensate') in the correct place. All of these terms ('switch', 'switchover', 'compensate') reflect broad terminology that signify a change involving the AC path or the DC path at an appropriate time. Hence, in a generic sense, the AC path is being tuned to crossover (i.e., take over) at the correct time, relative to where the frequency response of that RC filter currently rests. Hence, there is a tuning that occurs in which the low-pass output filter is used to determine the appropriate crossover parameters between the AC path and the DC path. In other example configurations, two error amplifiers can readily be used, where such tuning would again be used to determine an appropriate timing for the crossover.

In one example scenario, a lossy filter can be implemented and this can be used because the current is relatively low for this circuit arrangement. One advantage of such a simple design is that if a lower ripple is desired, a capacitor could readily be added to the output. Note that even though an RC filter is being showing in FIG. 3, other filters could also benefit from the teachings of the present disclosure (e.g., a resistor-inductor (RL) filter, an inductor-capacitor (LC) filter, etc.). Note that the divider segment (along with the feedback resistors) and the low-pass output filter can reside in a single chip or a standalone circuit such that a single output is provided to the load device. In one example, the filter can also be used as a current sense resistor. In one example arrangement, an error amplifier effectively controls the DC gain (boost) for the boost converter.

Figure 4:
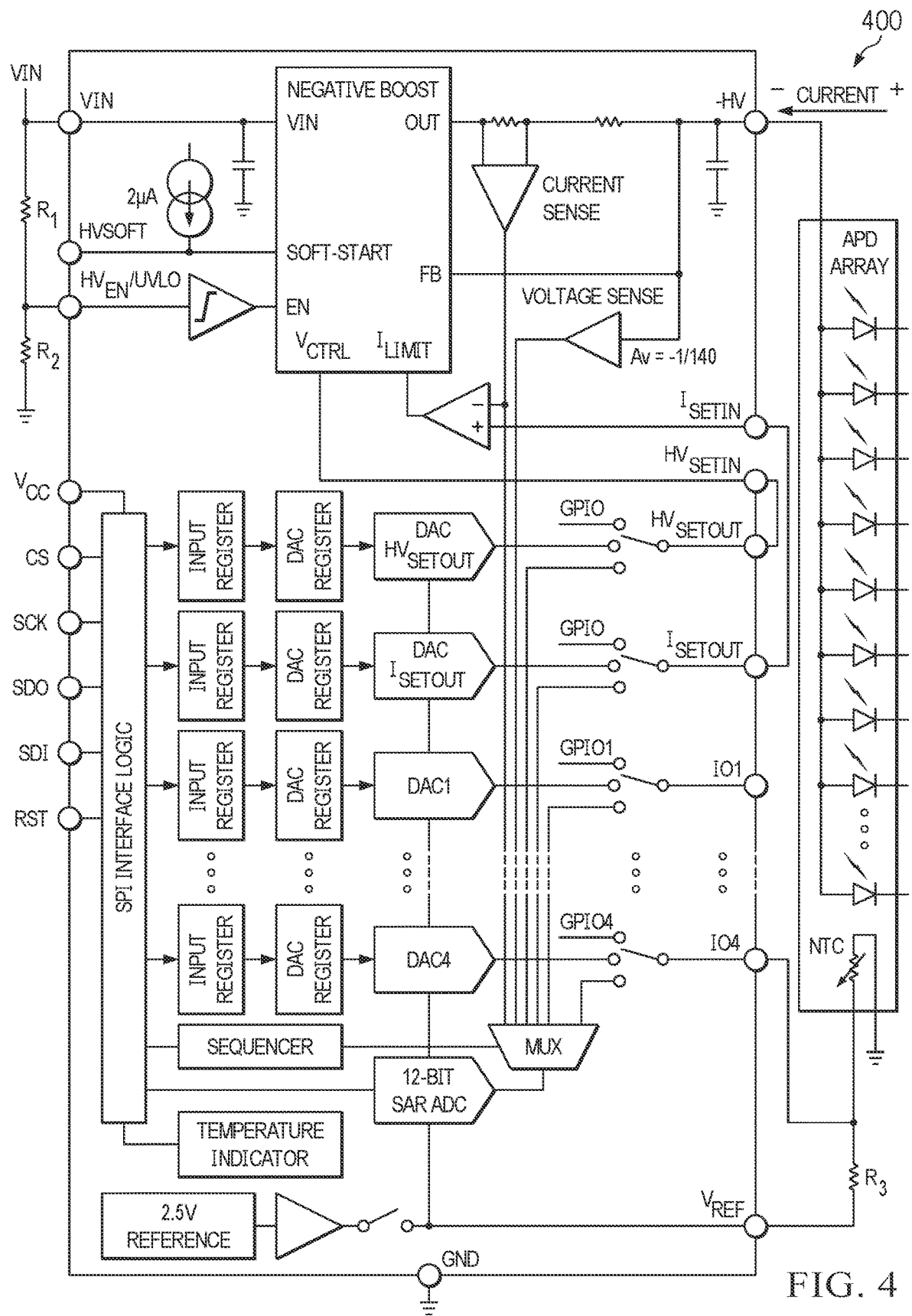
FIG. 4 illustrates an example schematic of a chip configured to supply power to a sensor array comprising a power supply, and their associated pinout interfaces, in accordance with other embodiments of the disclosure provided herein.

FIG. 4 illustrates an example schematic of a fully integrated system block 400 configured to supply power to a sensor array comprising a power supply, SPI logic, SAR ADC, MUX and their associated pinout interfaces, in accordance with other embodiments of the disclosure provided herein. In operation, high voltage is supplied to the −HV pinout. In one or more embodiments, this is used to reverse bias an array of avalanche photodiodes (APDs).

An APD is a highly sensitive semiconductor photodiode that exploits the photoelectric effect to convert light into electricity. From a functional standpoint, they can be regarded as the semiconductor analog of photomultipliers. Typical applications for APDs are laser rangefinders, long-range fiber-optic telecommunication, and quantum sensing for control algorithms. New applications include positron emission tomography and particle physics. APD arrays are becoming commercially available, also lightning detection and optical SETI may be future applications. It has been discovered in 2020 that adding graphene layer can prevent degradation over time to keep avalanche photodiodes like new, which is important in shrinking their size and costs for many diverse applications & bringing devices out of vacuum tubes into digital age.

By applying a high reverse bias voltage (typically 100-200 V in silicon), APDs show an internal current gain effect (around 100) due to impact ionization (avalanche effect). However, some silicon APDs employ alternative doping and beveling techniques compared to traditional APDs that allow greater voltage to be applied (>1500 V) before breakdown is reached and hence a greater operating gain (>1000). In general, the higher the reverse voltage, the higher the gain. Among the various expressions for the APD multiplication factor (M), an instructive expression is given by the formula:

$$M = \frac{1}{1 - \int_0^L \alpha(x)dx},$$

where L is the space-charge boundary for electrons, and a is the multiplication coefficient for electrons (and holes). This coefficient has a strong dependence on the applied electric field strength, temperature, and doping profile. Since APD gain varies strongly with the applied reverse bias and temperature, it is necessary to control the reverse voltage to keep a stable gain. Avalanche photodiodes therefore are more sensitive compared to other semiconductor photodiodes.

If very high gain is needed, detectors related to APDs (single-photon avalanche diodes) can be used and operated with a reverse voltage above a typical APD's breakdown voltage. In this case, the photodetector needs to have its signal current limited and quickly diminished. Active and passive current-quenching techniques have been used for this purpose. Single-photon avalanche photodiode (SPADs) that operate in this high-gain regime are sometimes referred to being in Geiger mode. This mode is particularly useful for single-photon detection, provided that the dark count event rate and after-pulsing probability are sufficiently low.

In one or more embodiments, the system includes an adjustable current limiter. This affords an additional level of safety, particularly in different voltage output in various applications. For example, a user to lower the current limit when going from a 300V to 400V application. The current limiter can be digital or analog. Additionally, the system provides for additional stability while using external capacitive loads, which are common in the art, since any added capacitance will reduce the 3 db bandwidth of the output pole.

Essentially having extra cap on the output will produce a larger RC time constant. This would normally make stabilizing the error amp loop even harder to do since a larger delay in the feedback is detrimental to stability. Since the patent circuit takes the AC path before this pole, any changes to increase the RC time constant is immune with this circuit.

In operation, the system is SPI controllable communicating with a chipset or other controller devises. Serial Peripheral Interface (SPI) is an interface bus commonly used to send data between microcontrollers and small peripherals such as shift registers, sensors, and SD cards. It uses separate clock and data lines, along with a select line to choose the device you wish to talk to. The Serial Peripheral Interface bus (SPI) is a synchronous serial communication interface specification used for short distance communication, primarily in embedded systems.

SPI devices communicate in full duplex mode using a primary-secondary architecture with a single primary. In contrast to devices employing simplex communication whereby data is only pushed in one direction, a full-duplex (FDX) system, or sometimes called double-duplex, allows communication in both directions, and, unlike half-duplex, allows this to happen simultaneously. As an example, landline telephone networks are full-duplex since they allow both callers to speak and be heard at the same time. Modern cell phones are also full duplex.

Primary/secondary architecture is a model of communication where one device or process has unidirectional control over one or more other devices. In some systems a primary is selected from a group of eligible devices, with the other devices acting in the role of secondaries. The primary device originates the frame for reading and writing. Multiple secondary devices are supported through selection with individual secondary select (SS) lines.

More specifically, devices communicate using a primary/secondary relationship, in which the primary initiates the data frame, as follows. When the primary generates a clock and selects a secondary device, data may be transferred in either or both directions simultaneously. In fact, as far as SPI is concerned, data are always transferred in both directions. It is up to the primary and secondary devices to know whether a received byte is meaningful or not. So, a device must discard the received byte in a "transmit only" frame or generate a dummy byte for a "receive only" frame.

Sometimes SPI is called a four-wire serial bus, contrasting with three-, two-, and one-wire serial buses. The SPI may be accurately described as a synchronous serial interface, but it is different from the Synchronous Serial Interface (SSI) protocol, which is also a four-wire synchronous serial communication protocol. But SSI Protocol employs differential signaling and provides only a single simplex communication channel.

SPI devices are useful because the receiving hardware can be implemented as a simple shift register. This is a much simpler (and cheaper) piece of hardware than the full-up UART (Universal Asynchronous Receiver/Transmitter) that asynchronous serial requires.

Referencing back to FIG. 4, another advantage the current architecture provides is a guaranteed output voltage set precision over temperature. Specifically, the present embodiment can accommodate and adjust changes due to drift and other undesirable effects of temperature. The present state of the art does not offer a stable power supply over a broad range of voltages. The instant embodiment can produce stable voltage in the hundreds of volts, plus or minus. In a preferred embodiment, the range is 0V to −375V. The system yields high voltage measurement precision with a high current measurement precision (e.g., gen2 and iPassive).

Other system features include accuracy over current loading; extra IOs used to simplify system design (e.g., TIAs, etc.); wide operating range (input voltage to output voltage ratio); high input voltage range allows for higher efficiency; built-in package creepage and clearance at the output pin to shrink solution size; built in GPIO/DACs, ADCs; negative voltage generation, as needed; and ecosystem with adjustable TIA.

Figure 5:
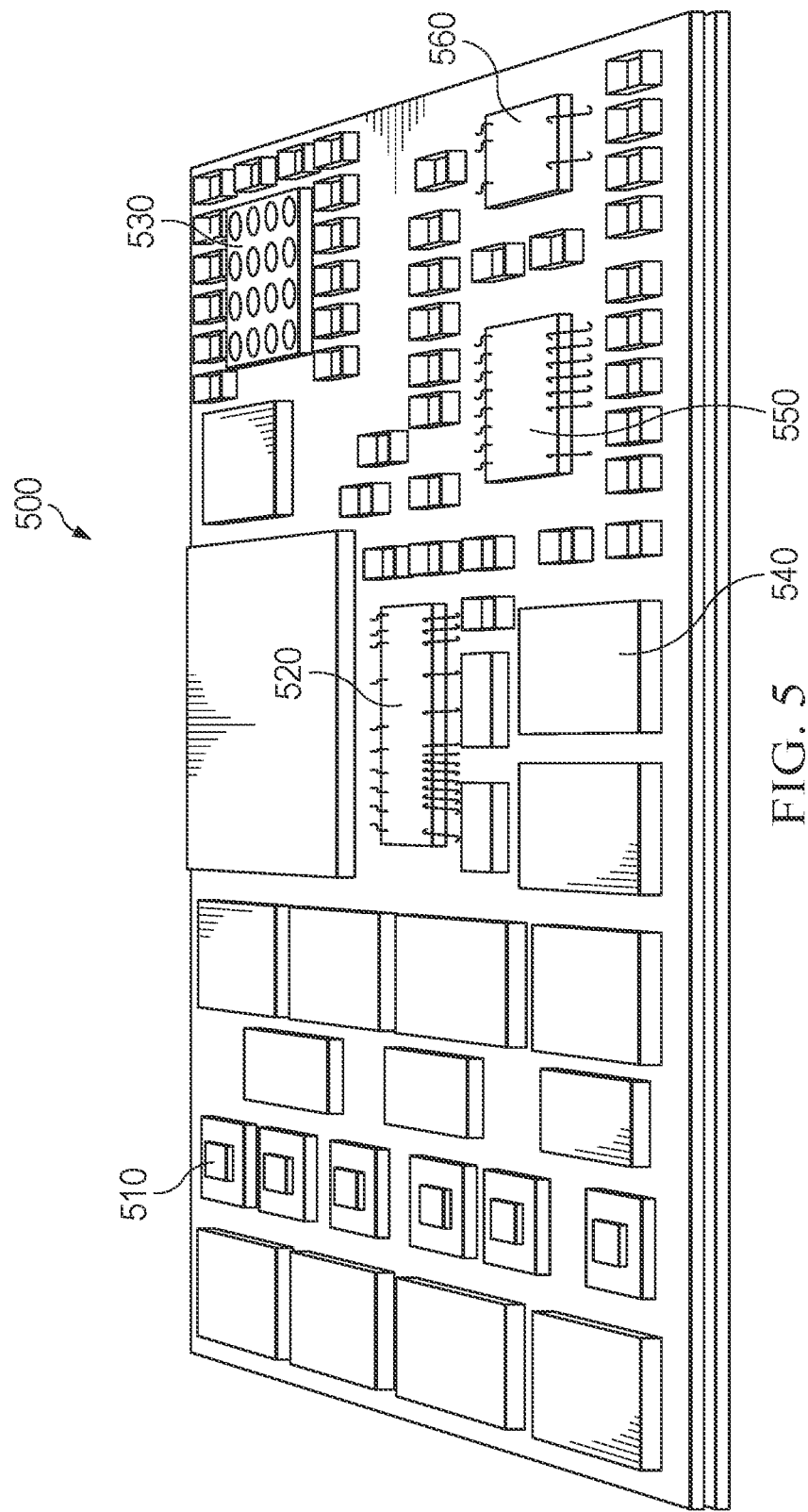
FIG. 5 illustrates an example packaging layout for a power supply system, in accordance with other embodiments of the disclosure provided herein.

FIG. 5 illustrates an example packaging layout for a power supply system 500, in accordance with other embodiments of the disclosure provided herein. The layout comprises a high voltage charge pump 510, a boost 520, an ADC/DAC/REF circuit 530, high precision resistors 540, an operational amplifier 550, and a comparator 560. An operational amplifier (often referred to as an 'op amp' or 'opamp') is a DC-coupled high-gain electronic voltage amplifier with a differential input and, usually, a single-ended output. In this configuration, an op amp produces an output potential (relative to circuit ground) that is typically 100,000 times larger than the potential difference between its input terminals. Operational amplifiers had their origins in analog computers, where they were used to perform mathematical operations in linear, non-linear, and frequency-dependent circuits.

A comparator is a device that compares two voltages or currents and outputs a digital signal indicating which is larger. It typically has two analog input terminals and one binary digital output. A comparator comprises a specialized high-gain differential amplifier. They are commonly used in devices that measure and digitize analog signals, such as successive-approximation ADCs, as well as relaxation oscillators.

Figure 6:
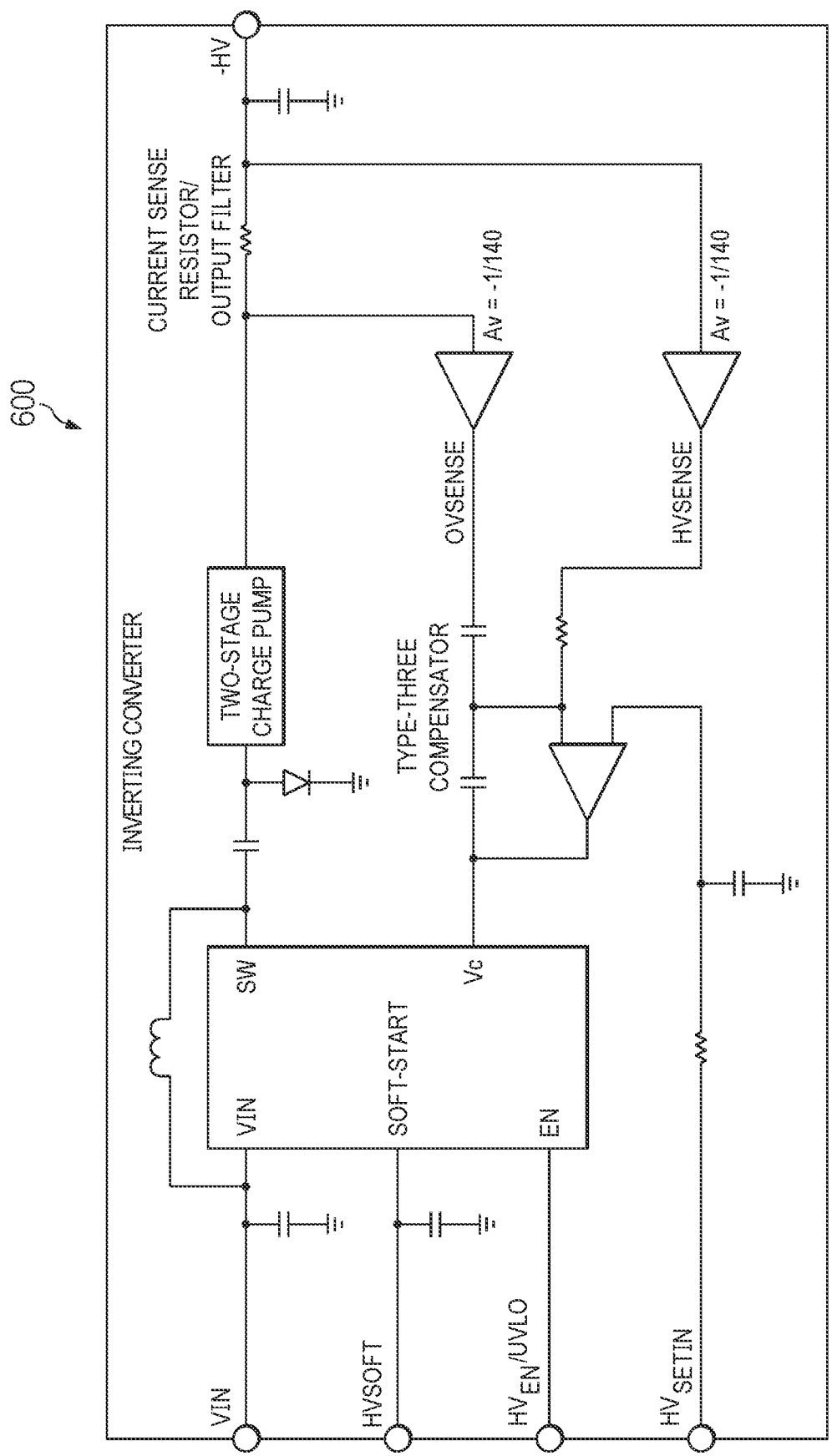
FIG. 6 illustrates an example schematic of a power supply circuit including two separate AC/DC pathway signals, in accordance with other embodiments of the disclosure provided herein.

FIG. 6 illustrates an example schematic of a power supply circuit 600 including two separate AC/DC pathway signals, in accordance with other embodiments of the disclosure provided herein. Power supply circuit comprises power source, inverting converter, ground diode, 2-stage charge pump, over voltage sense amp, high-voltage sense amp, set voltage resistor and capacitor, type 3 compensator, current sense resistor, and output capacitor, which form the output filter.

In some embodiments, the inductor is used in switching conversion. The capacitor and diode are implemented to crate the inverting converter. In other embodiments and architectures positive supplies can be crated. The stage charge pumped is used to increase the boost ratio. One skilled in the art will appreciate the charge pump is unnecessary is no increase in boost in need. Similarly, it can be replaced with a transformer.

The AC/DC amplifiers can be used as generic attenuators/inverters. In other embodiments, resistor divider (e.g., voltage ladder) with a negative reference can produce the same function. Additionally, one can split the function with a resister divider and an inverting amp, or any combination thereof. The type 3 compensator is the feedback capacitor to create the error amp, in some embodiments.

The embodiments described and illustrated herein are not meant by way of limitation and are rather example of the kinds of features and techniques that those skilled in the art might benefit from in implementing a wide variety of useful products and processes. For example, in addition to the applications described in the embodiments relating to switched power conversion, those skilled in the art would appreciate that the present disclosure can be applied to buck, boost, buck-boost, linear regulator and other DC-DC power conversion topologies. However, it is to be appreciated that the present example embodiments are also amenable to other like applications and inputs, such as, alternating currents and voltages.

While many embodiments focus on biasing avalanche photodiodes, other light detecting devices are not beyond the scope of the present disclosure, such as, photosensors. Photosensitive elements are sensors of light or other electromagnetic energy. In some embodiments, the photosensitive elements are photodetector which have p-n junctions that converts light photons into current. The absorbed photons make electron-hole pairs in the depletion region, which is used to detect received light intensity. In some other embodiments, photodetector are photodiodes or phototransistors. Other light detecting means are not beyond the scope of the disclosure either. For example, in addition to APDs, SPADs photomultipliers tubes (PMTS) are not beyond the scope of the present can be used.

A single-photon avalanche diode (SPAD) is a solid-state photodetector within the same family as photodiodes and APDs, while also being fundamentally linked with basic diode behaviors. As with photodiodes and APDs, a SPAD is based around a semi-conductor p-n junction that can be illuminated with ionizing radiation such as gamma, x-rays, beta, and alpha particles along with a wide portion of the electromagnetic spectrum from ultraviolet (UV) through the visible wavelengths and into the infrared (IR).

In a photodiode, with a low reverse bias voltage, the leakage current changes linearly with absorption of photons (i.e., the liberation of current carriers (electrons and/or holes) due to the internal photoelectric effect). However, in a SPAD, the reverse bias is so high that a phenomenon called impact ionization occurs which can cause an avalanche current to develop. Simply, a photo-generated carrier is accelerated by the electric field in the device to a kinetic energy which is enough to overcome the ionization energy of the bulk material, knocking electrons out of an atom.

A large avalanche of current carriers grows exponentially and can be triggered from as few as a single photon-initiated carrier. A SPAD is able to detect single photons providing short duration trigger pulses that can be counted. However, they can also be used to obtain the time of arrival of the incident photon due to the high speed that the avalanche builds up and the device's low timing jitter.

The fundamental difference between SPADs and APDs or photodiodes, is that a SPAD is biased well above its reverse-bias breakdown voltage and has a structure that allows operation without damage or undue noise. While an APD can act as a linear amplifier, the level of impact ionization and avalanche within the SPAD has prompted researchers to liken the device to a Geiger-counter in which output pulses indicate a trigger or "click" event. The diode bias region that gives rise to this "click" type behavior is therefore called the "Geiger-mode" region.

As with photodiodes the wavelength region in which it is most sensitive is a product of its material properties, in particular the energy bandgap within the semiconductor. Many materials including silicon, germanium and other III-V elements have been used to fabricate SPADs for the large variety of applications that now utilize the run-away avalanche process. There is much research in this topic with activity implementing SPAD-based systems in CMOS fabrication technologies, and investigation and use of III-V material combinations for single-photon detection at dedicated wavelengths.

Photomultiplier tubes (photomultipliers or PMTs for short), members of the class of vacuum tubes, and more specifically vacuum phototubes, are extremely sensitive detectors of light in the ultraviolet, visible, and near-infrared ranges of the electromagnetic spectrum. These detectors multiply the current produced by incident light by as much as 100 million times or 108 (i.e., 160 dB),[1] in multiple dynode stages, enabling (for example) individual photons to be detected when the incident flux of light is low.

The combination of high gain, low noise, high frequency response or, equivalently, ultra-fast response, and large area of collection has maintained photomultipliers an essential place in low light level spectroscopy, confocal microscopy, Raman spectroscopy, fluorescence spectroscopy, nuclear and particle physics, astronomy, medical diagnostics including blood tests, medical imaging, motion picture film scanning (telecine), radar jamming, and high-end image scanners known as drum scanners. Elements of photomultiplier technology, when integrated differently, are the basis of night vision devices. Research that analyzes light scattering, such as the study of polymers in solution, often uses a laser and a PMT to collect the scattered light data.

Semiconductor devices, particularly silicon photomultipliers and avalanche photodiodes, are alternatives to classical photomultipliers; however, photomultipliers are uniquely well-suited for applications requiring low-noise, high-sensitivity detection of light that is imperfectly collimated The above description of illustrated embodiments, including what is described in the Abstract, is not intended to be exhaustive or limiting as to the precise forms disclosed. While specific implementations of, and examples for, various embodiments or concepts are described herein for illustrative purposes, various equivalent modifications may be possible, as those skilled in the relevant art will recognize. These modifications may be made in light of the above detailed description, the Abstract, the Figures, or the claims.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein.

Those skilled in the art will recognize or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present disclosure.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

The above-described embodiments may be implemented in any of numerous ways. One or more aspects and embodiments of the present application involving the performance of processes or methods may utilize program instructions executable by a device (e.g., a computer, a processor, or other device) to perform, or control performance of, the processes or methods.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above.

The computer readable medium or media may be transportable, such that the program or programs stored thereon may be loaded onto one or more different computers or other processors to implement various ones of the aspects described above. In some embodiments, computer readable media may be non-transitory media.

Note that the activities discussed above with reference to the FIGURES which are applicable to any integrated circuit that involves signal processing (for example, gesture signal processing, video signal processing, audio signal processing, analog-to-digital conversion, digital-to-analog conversion), particularly those that can execute specialized software programs or algorithms, some of which may be associated with processing digitized real-time data.

In some cases, the teachings of the present disclosure may be encoded into one or more tangible, non-transitory computer-readable mediums having stored thereon executable instructions that, when executed, instruct a programmable device (such as a processor or DSP) to perform the methods or functions disclosed herein. In cases where the teachings herein are embodied at least partly in a hardware device (such as an ASIC, IP block, or SoC), a non-transitory medium could include a hardware device hardware-programmed with logic to perform the methods or functions disclosed herein. The teachings could also be practiced in the form of Register Transfer Level (RTL) or other hardware description language such as VHDL or Verilog, which can be used to program a fabrication process to produce the hardware elements disclosed.

In example implementations, at least some portions of the processing activities outlined herein may also be implemented in software. In some embodiments, one or more of these features may be implemented in hardware provided external to the elements of the disclosed figures or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Any suitably configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, an FPGA, an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, processors may store information in any suitable type of non-transitory storage medium (for example, random access memory (RAM), read only memory (ROM), FPGA, EPROM, electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe.

Any of the memory items discussed herein should be construed as being encompassed within the broad term 'memory.' Similarly, any of the potential processing elements, modules, and machines described herein should be construed as being encompassed within the broad term 'microprocessor' or 'processor.' Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a personal digital assistant (PDA), a smart phone, a mobile phone, an iPad, or any other suitable portable or fixed electronic device.

Also, a computer may have one or more input and output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Computer-executable instructions may be in many forms, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

The terms "program" or "software" are used herein in a generic sense to refer to any type of computer code or set of computer-executable instructions that may be employed to program a computer or other processor to implement various aspects as described above. Additionally, it should be appreciated that according to one aspect, one or more computer programs that when executed perform methods of the present application need not reside on a single computer or processor but may be distributed in a modular fashion among a number of different computers or processors to implement various aspects of the present application.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code may be executed on any suitable processor or collection of processors, whether provided in a single computer or distributed among multiple computers.

Computer program logic implementing all or part of the functionality described herein is embodied in various forms, including, but in no way limited to, a source code form, a computer executable form, a hardware description form, and various intermediate forms (for example, mask works, or forms generated by an assembler, compiler, linker, or locator). In an example, source code includes a series of computer program instructions implemented in various programming languages, such as an object code, an assembly language, or a high-level language such as OpenCL, RTL, Verilog, VHDL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In some embodiments, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc.

Other components such as external storage, additional sensors, controllers for audio/video display, and peripheral devices may be attached to the board as plug-in cards, via cables, or integrated into the board itself. In another example embodiment, the electrical circuits of the FIGURES may be implemented as standalone modules (e.g., a device with associated components and circuitry configured to perform a specific application or function) or implemented as plug-in modules into application-specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this disclosure.

In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Example Data Processing System

Figure 7:
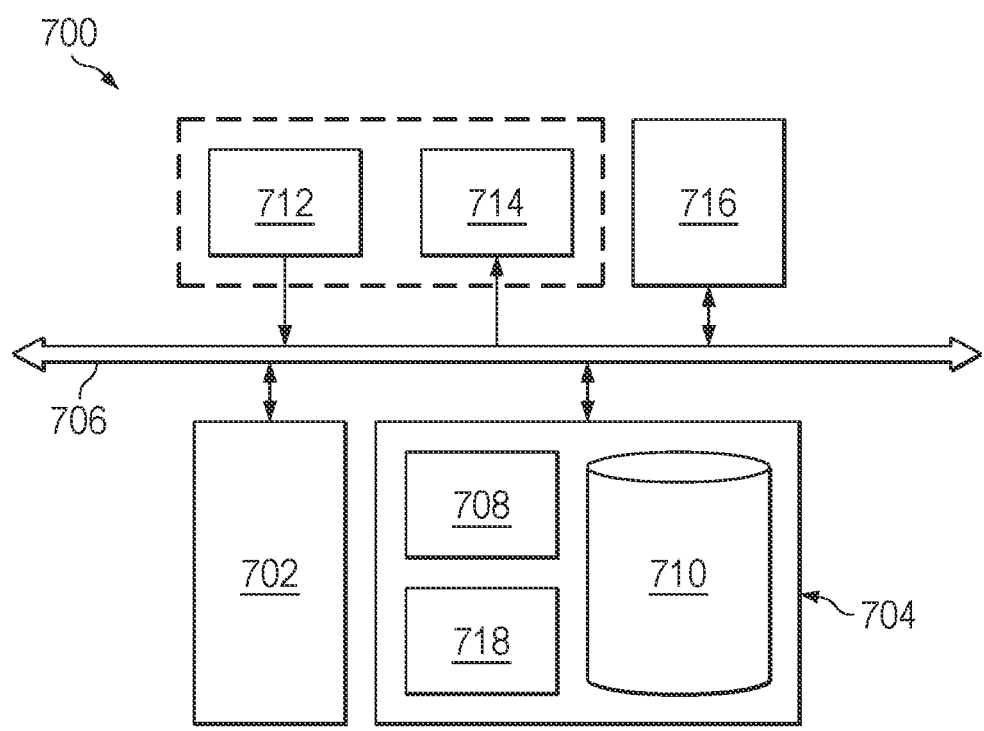
FIG. 7 is a simplified circuit diagram illustrating one example implementation of the AC and DC stabilizing path configuration, according to certain embodiments of the present disclosure.

FIG. 7 is a simplified circuit diagram 700 illustrating one example implementation for providing an AC and DC stabilizing path for a power supply, according to certain embodiments of the present disclosure. Such a data processing system could be configured to function as the circuits described herein or as any other system configured to implement various improved mechanisms related to element matching techniques as described herein.

As shown in FIG. 7, the data processing system 700 may include at least one processor 702 coupled to memory elements 704 through a system bus 706. As such, the data processing system may store program code within memory elements 704. Further, the processor 702 may execute the program code accessed from the memory elements 704 via a system bus 706. In one aspect, the data processing system may be implemented as a computer that is suitable for storing and/or executing program code. It should be appreciated, however, that the data processing system 700 may be implemented in the form of any system including a processor and a memory that is capable of performing the functions described within this specification.

The memory elements 704 may include one or more physical memory devices such as, for example, local memory 708 and one or more bulk storage devices 710. The local memory may refer to random access memory or other non-persistent memory device(s) generally used during actual execution of the program code. A bulk storage device may be implemented as a hard drive or other persistent data storage device. The processing system 700 may also include one or more cache memories (not shown) that provide temporary storage of at least some program code in order to reduce the number of times program code must be retrieved from the bulk storage device 710 during execution.

Input/output (I/O) devices depicted as an input device 712 and an output device 714, optionally, can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 7 with a dashed line surrounding the input device 712 and the output device 714). An example of such a combined device is a touch sensitive display, also sometimes referred to as a "touch screen display" or simply "touch screen". In such an embodiment, input to the device may be provided by a movement of a physical object, such as e.g., a stylus or a finger of a user, on or near the touch screen display.

A network adapter 716 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 700, and a data transmitter for transmitting data from the data processing system 700 to said systems, devices and/or networks. Modems, cable modems, and Ethernet cards are examples of different types of network adapter that may be used with the data processing system 700.

As pictured in FIG. 7, the memory elements 704 may store an application 718. In various embodiments, the application 718 may be stored in the local memory 708, the one or more bulk storage devices 710, or apart from the local memory and the bulk storage devices. It should be appreciated that the data processing system 700 may further execute an operating system (not shown in FIG. 7) that can facilitate execution of the application 718. The application 718, being implemented in the form of executable program code, can be executed by the data processing system 700, e.g., by the processor 702. Responsive to executing the application, the data processing system 700 may be configured to perform one or more operations or method steps described herein.

Variations and Implementations

While embodiments of the present disclosure were described above with references to example implementations as shown in FIGS. 1-7, a person skilled in the art will realize that the various teachings described above are applicable to a large variety of other implementations. For example, while some descriptions provided in the present disclosure refer to thermometer coding, these descriptions are equally applicable to other coding methods used in AC and DC stabilizing paths for variable filtered supplies. Further, while examples provided herein are described with reference to single units (e.g., error amplifiers) any number of filtering units and error amplifiers could be used.

Embodiments of the present disclosure may be particularly advantageous for high accuracy variable filtered supplies because of their low current characteristics. However, the techniques presented herein are not limited to such applications as they are equally applicable, possibly with modifications that would be apparent to a person of ordinary skill in the art. Still further, embodiments of the present disclosure may be used in stand-alone chips or circuits, as well as in embedded feedback components in analog-to-digital converter (ADC) designs.

In certain contexts, the features discussed herein can be applicable to automotive systems (e.g., automotive LIDAR), safety-critical industrial applications, medical systems, scientific instrumentation, wireless and wired communications, radar, industrial process control, audio and video equipment, current sensing, instrumentation (which can be highly precise), and other digital-processing-based systems.

Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind).

In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions.

In the discussions of the embodiments above, components of a system, such as e.g., clocks, multiplexers, buffers, and/or other components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure related to improved switching techniques. Parts of various systems for implementing improved mechanisms for providing an AC and DC stabilizing path for a power supply as proposed herein can include electronic circuitry to perform the functions described herein. In some cases, one or more parts of the system can be provided by a processor specially configured for carrying out the functions described herein. For instance, the processor may include one or more application specific components, or may include programmable logic gates which are configured to carry out the functions describe herein. The circuitry can operate in analog domain, digital domain, or in a mixed signal domain. In some instances, the processor may be configured to carrying out the functions described herein by executing one or more instructions stored on a non-transitory computer readable storage medium.

In one example embodiment, any number of electrical circuits of FIGS. 1-7 may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the preceding FIGURES may be implemented as stand-alone modules (e.g., a device with associated components and circuitry configured to perform a specific application or function) or implemented as plug-in modules into application specific hardware of electronic devices. Note that particular embodiments of the present disclosure implementing improved mechanisms for providing an AC and DC stabilizing path for a power supply may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the functionalities of improved mechanisms for providing an AC and DC stabilizing path for a power supply proposed herein may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of FIGS. 1-7 may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of FIGS. 1-7 and its teachings are readily scalable and can accommodate a large number of components, as well as more complicated/ sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to the improved mechanisms for providing an AC and DC stabilizing path for a power supply as proposed herein illustrate only some of the possible functions that may be executed by, or within, system illustrated in FIGS. 1-7. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Although the claims are presented in single dependency format in the style used before the USPTO, it should be understood that any claim can depend on and be combined with any preceding claim of the same type unless that is clearly technically infeasible. Note that all optional features of the apparatus described above may also be implemented with respect to the method or process described herein and specifics in the examples may be used anywhere in one or more embodiments.

Interpretation of Terms

All definitions, as defined and used herein, should be understood to control over dictionary definitions, definitions in documents incorporated by reference, and/or ordinary meanings of the defined terms. Unless the context clearly requires otherwise, throughout the description and the claims:

"comprise," "comprising," and the like are to be construed in an inclusive sense, as opposed to an exclusive or exhaustive sense; that is to say, in the sense of "including, but not limited to."

"connected," "coupled," or any variant thereof, means any connection or coupling, either direct or indirect, between two or more elements; the coupling or connection between the elements can be physical, logical, or a combination thereof.

"herein," "above," "below," and words of similar import, when used to describe this specification shall refer to this specification as a whole and not to any particular portions of this specification.

"or," in reference to a list of two or more items, covers all of the following interpretations of the word: any of the items in the list, all of the items in the list, and any combination of the items in the list.

the singular forms "a," "an" and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined.

Elements other than those specifically identified by the "and/or" clause may optionally be present, whether related or unrelated to those elements specifically identified. Thus, as a non-limiting example, a reference to "A and/or B," when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B);

in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the term "between" is to be inclusive unless indicated otherwise. For example, "between A and B" includes A and B unless indicated otherwise.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke 35 U.S.C. § 112(f) as it exists on the date of the filing hereof unless the words "means for" or "steps for" are specifically used in the particular claims; and (b) does not intend, by any statement in the disclosure, to limit this disclosure in any way that is not otherwise reflected in the appended claims.

The present invention should therefore not be considered limited to the particular embodiments described above. Various modifications, equivalent processes, as well as numerous structures to which the present invention may be applicable, will be readily apparent to those skilled in the art to which the present invention is directed upon review of the present disclosure.

What is claimed is:

1. A system for providing stabilization for a circuit, comprising:
   a switching converter coupled to a power source;
   a low-pass filter coupled to a load device;
   a direct current (DC) path; and
   an alternating current (AC) path, wherein the DC path and the AC path are provided between the switching converter and the low-pass filter, and wherein the AC path provides a non-phased information signal to be used to compensate for a phase delay occurring in the DC path.

2. The system of claim 1, wherein the DC path is configured to provide control, at low frequency, for an output to the load device.

3. The system of to claim 1, further comprising:
   an error amplifier coupled to the DC path and the AC path, wherein the low-pass filter and the error amplifier are configured to determine a switchover between the AC path and DC path.

4. The system of claim 1, further comprising:
   an error amplifier coupled to the switching converter, wherein the error amplifier affects a DC gain for the switching converter.

5. The system of claim 1, wherein the system includes the low-pass filter and a resistor that are configured to operate as a lossy filter.

6. The system of claim 1, further comprising:
   a capacitor coupled to an output of the system in order to achieve a targeted ripple characteristic.

7. The system of claim 1, wherein the system is part of a resistor-capacitor filter.

8. The system of claim 1, further comprising:
   a resistor divider segment configured to control a DC gain for the circuit.

9. The system of claim 1, wherein the low-pass filter is configured for use as a current sense resistor.

10. The system of claim 1, further comprising:
    a boost converter that includes the switching converter, which further comprises at least one inductor and at least one diode.

11. The system of claim 1, wherein the system is part of a resistor-inductor (RL) filter.

12. The system of claim 1, wherein the system is part of an inductor-capacitor (LC) filter.

13. A method for providing stabilization for a circuit, the method comprising:
    powering up the circuit with a power source coupled to a switching converter;
    evaluating a voltage output through an error amplifier;
    comparing the voltage output to a set point associated with a target voltage output;
    enabling the switch converter to evaluate an alternating current (AC) path and a direct current (DC) path, including using a low-pass filter coupled to a load device;
    evaluating the DC path to identify an absolute voltage for comparison with the set point associated with the target voltage output; and
    changing an AC response based, at least in part, on the comparison such that the voltage output of the circuit is moved closer to the set point.

14. The method of claim 13, further comprising:
    increasing the voltage output on the output of the circuit based on the comparison.

15. The method of claim 13, further comprising:
    decreasing the voltage output on the output of the circuit based on the comparison.

16. The method of claim 13, further comprising:
    providing a capacitor coupled to an output of the circuit in order to achieve a targeted ripple characteristic.

17. A non-transitory computer readable storage medium storing software code portions configured for, when executed on a processor, providing stabilization for a circuit by:
    powering up the circuit with a power source coupled to a switching converter;
    evaluating a voltage output through an error amplifier;
    comparing the voltage output to a set point associated with a target voltage output;
    enabling the switch converter to evaluate an alternating current (AC) path and a direct current (DC) path;
    evaluating the DC path to identify an absolute voltage for comparison with the set point associated with the target voltage output; and
    changing an AC response based, at least in part, on the comparison such that the voltage output of the circuit is moved closer to the set point.

18. The non-transitory computer readable storage medium according to claim 17, wherein the software code portions are further configured for:
  increasing the voltage output on the output of the circuit based on the comparison.

19. The non-transitory computer readable storage medium according to claim 17, wherein the software code portions are further configured for:
  decreasing the voltage output on the output of the circuit based on the comparison.

20. The non-transitory computer readable storage medium according to claim 17, wherein the software code portions are further configured for:
  providing a capacitor coupled to an output of the circuit in order to achieve a targeted ripple characteristic.

* * * * *